United States Patent [19]

Herdzina

[11] Patent Number: 4,860,569

[45] Date of Patent: Aug. 29, 1989

[54] CONVEYOR FOR CONVERSION SYSTEMS

[75] Inventor: Frank J. Herdzina, Schaumburg, Ill.

[73] Assignee: Service Tool Die & Mfg. Company, Elk Grove Village, Ill.

[21] Appl. No.: 189,015

[22] Filed: May 2, 1988

[51] Int. Cl.$^4$ .............................................. B21D 43/12
[52] U.S. Cl. ...................................... 72/361; 198/846
[58] Field of Search .......................... 198/803.15, 846; 72/361; 413/56

[56] References Cited

U.S. PATENT DOCUMENTS 2,711,815 6/1955 Lorig .................................... 198/846
3,231,065 1/1966 Kaminski et al. ............... 198/803.15
4,411,146 10/1983 Sulasaari et al. ...................... 72/180

Primary Examiner—Lowell A. Larson
Attorney, Agent, or Firm—Kinzer, Plyer, Dorn, McEachran & Jambor

[57] ABSTRACT

A press for converting work pieces into finished parts has an endless conveyor for carrying work pieces into and out of the area of the press tooling. Work pieces rest in openings formed in the conveyor. A vacuum box on the lower side of the conveyor's forward run applies a vacuum to the work pieces to retain them on the conveyor. The conveyor has a plurality of transverse beads located intermediate the work piece openings. The beads stiffen the conveyor, thereby reducing deflection of the belt due to the load placed on it from the underside by the vacuum box.

6 Claims, 1 Drawing Sheet

U.S. Patent         Aug. 29, 1989         4,860,569
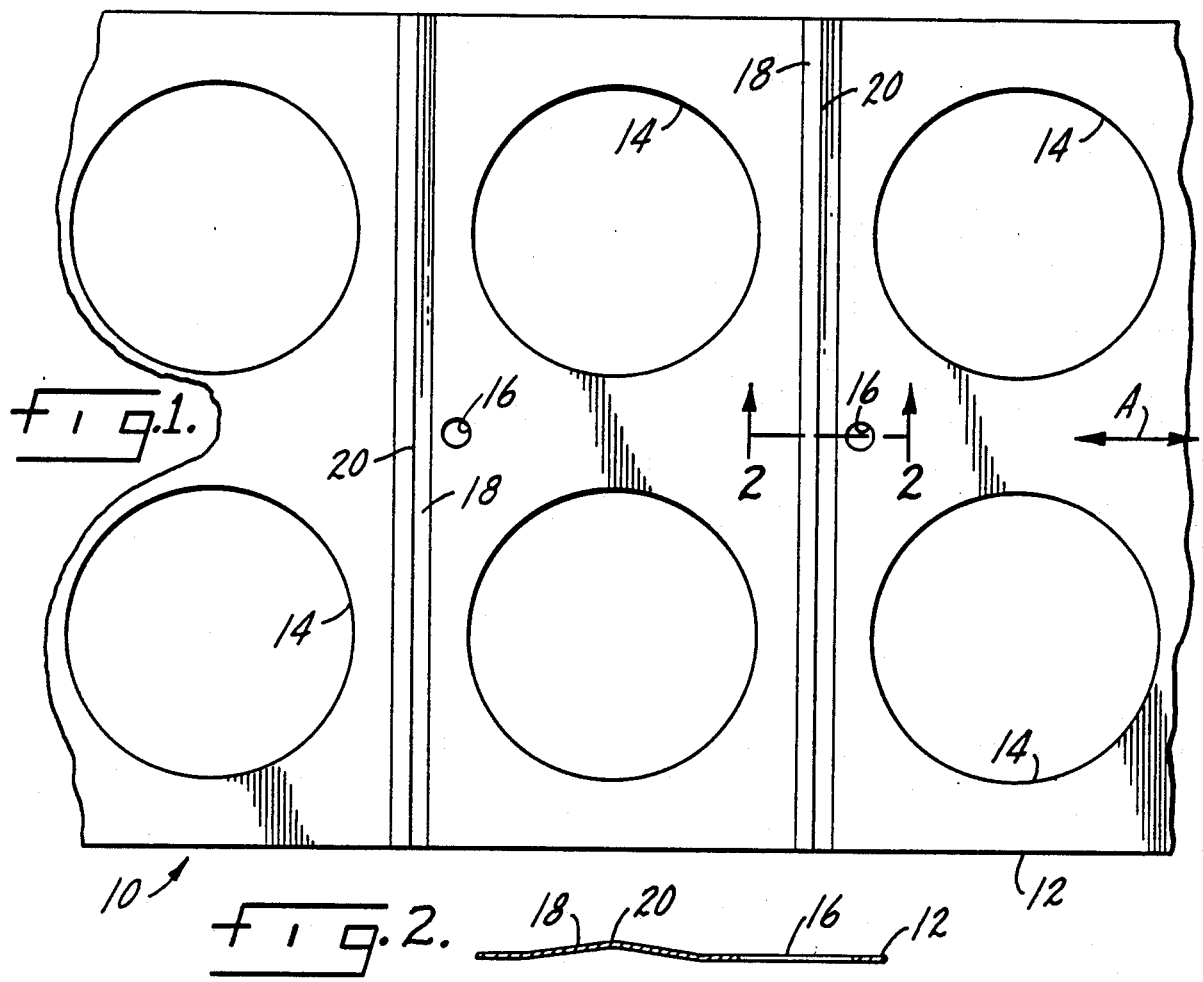
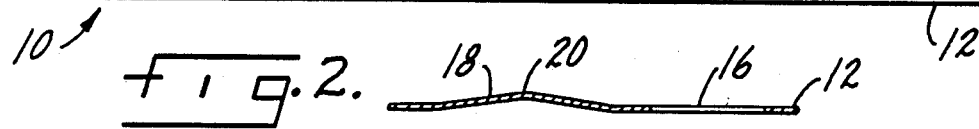
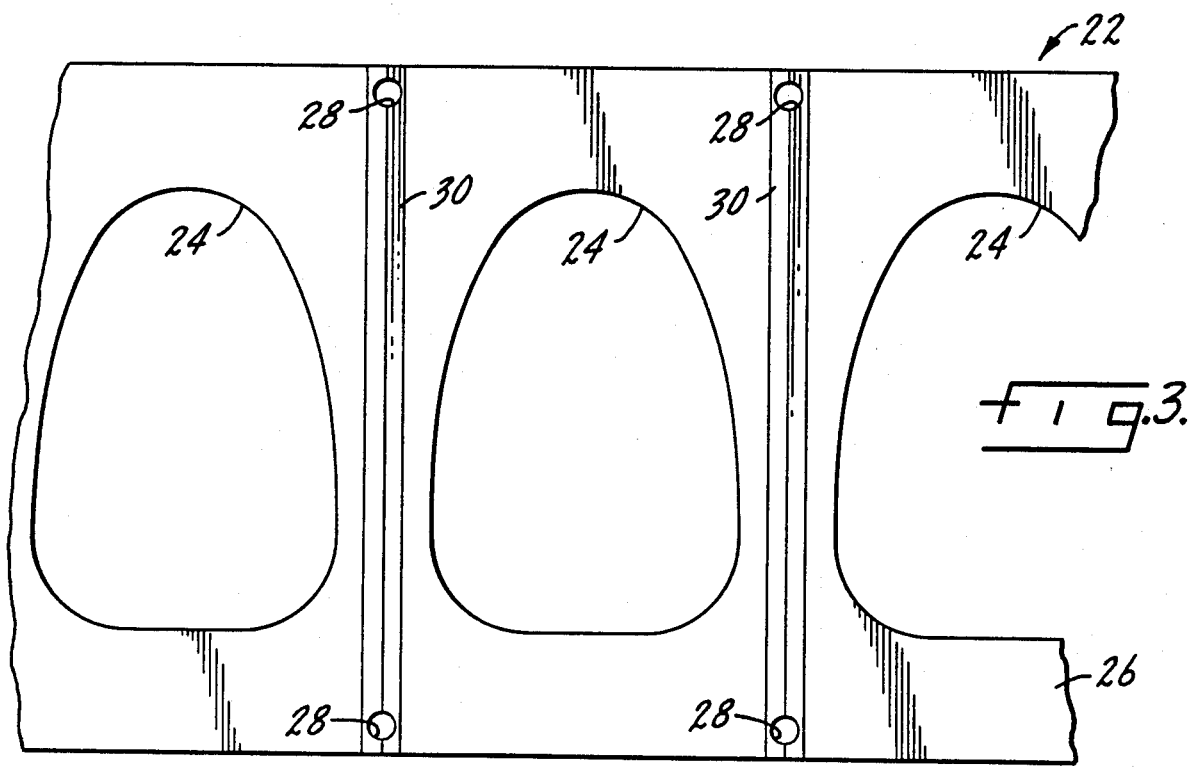

CONVEYOR FOR CONVERSION SYSTEMS

BACKGROUND OF THE INVENTION

This invention relates to conversion systems. It is particularly adapted for conversion systems making easy-open can ends and the like, although it will be understood that it could apply to presses manufacturing other types of parts.

Presses for converting ends for cans are known. Presses of this general type are available from the Minster Machine Company of Minster, Ohio. U.S. patent application Ser. No. 143,585, filed Jan. 13, 1988, and assigned to the present assignee, shows a general layout of a press for processing work pieces or shells into finished can ends. The disclosure of that application is hereby incorporated by reference herein.

The presses used for the manufacture of easy-open can ends generally comprise a press bed mounted on legs, which rest on the floor. Four columns or uprights or pillars are mounted on the press bed. The columns support a crown in which a main drive for the various press components is mounted. The columns also have slides or ways attached thereto for supporting a reciprocating ram. The ram carries upper tooling, which cooperates with lower tooling on the bed. The tooling defines a plurality of stations in which the shells are progressively converted into easy-open can ends. A conveyor carries the shells into and through the stations of the die tooling. The shells merely rest in openings in the conveyor. They are held in place by a vacuum box placed generally underneath the forward run of the conveyor at the area of the tooling.

While it is known to use a vacuum box to retain the shells on the conveyor, the load imposed by the vacuum box on the shells is, of course, transferred to the conveyor itself. Conventional conveyors are then subject to deflection under the influence of the vacuum box. This can cause loss of registration between the shells and the tooling, which in turn causes production of defective parts.

SUMMARY OF THE INVENTION

The present invention concerns a conveyor for use in a conversion system which is not subject to deflection under loads imposed by a vacuum box. The conveyor of the present invention is strengthened to withstand vacuum loads by a plurality of transverse beads extending across the full width of the conveyor. The beads comprise upraised ridges or ribs formed in the conveyor. The ribs are located intermediate the work piece openings.

BRIEF DESCRIPTION OF THE DRAWINGS

FIG. 1 is a plan view of conveyor of the present invention.

FIG. 2 is an enlarged section taken generally along line 2—2 of FIG. 1.

FIG. 3 is a plan view of an alternate arrangement of the conveyor.

DETAILED DESCRIPTION OF THE INVENTION

A portion of a conveyor for use in a dual lane conversion system is shown in FIG. 1 at 10. It will be understood that the conveyor 10 forms an endless belt which is driven about head and tail end pulleys of sprockets. The head end pulley or sprocket will drive the conveyor in a direction parallel to arrow A. This will be referred to as the longitudinal direction of the conveyor. Further, the top or forward run of the conveyor carries work pieces into and through the area of the tooling on a conversion press. Details of this construction are shown and described in the above-referenced patent application.

The conveyor 10 comprises a continuous web 12. The conveyor may be made of conventional material, such as the commonly-used sheet metal. The web has a plurality of work piece openings 14. The web 12 also has a plurality of drive holes 16 which receive the lugs of a conveyor drive sprocket (not shown). In the embodiment shown, the work piece openings 14 are round, making them suitable for carrying shells to be converted into can ends. The work piece openings are arranged for a dual lane conversion system, although it could be otherwise.

A plurality of beads 18 extend transversely across the width of the web 12. Each bead 18 has an upraised ridge or peak 20 which extends out of the plane of the web 12. The beads 18 stiffen the conveyor against deflection, particularly in a transverse direction. Thus, the conveyor of the present invention is particularly resistant to sagging or bowing in the sense parallel to its direction of movement. In other words, the conveyor will resist deflection which would tend to draw its longitudinal center line below the lateral edges.

It will be understood that whereas FIG. 2 shows a bead having a generally triangular cross-section, other configurations could be used. For example, the bead could have a generally rounded cross-section. The important factor is that the bead is formed out of the plane of the web 12. While it is shown and preferred that the bead is upraised on the forward run of the belt, it could be otherwise.

In FIG. 3, an alternate conveyor is shown at 22. In this embodiment a single row of work piece openings 24 is formed in the web 26. The drive holes 28 are located near the lateral edges of the web. They are also formed within the beads 30. This placement of the drive holes 28 is necessitated by the size and shape of the work piece openings 24. It can readily be seen that the arrangement of the work piece openings will dictate the location of the drive holes. The drive holes may or may not be located on the beads, as desired.

While the beads are shown extending fully across the web of the conveyor, it will be understood that other arrangements are possible. For example, the beads could stop short of the edges. Or they could be intermittently formed along the width of the conveyor. Therefore, the scope of the invention is not limited to the embodiments shown but rather is commensurate with the scope of the following claims.

I claim:

1. In a press for converting work pieces into parts, the press having lower tooling including a tool shoe mounted on a bed and upper tooling mounted on a reciprocating ram which moves the upper tooling into and out of operative engagement with the lower tooling, the upper and lower tooling having a plurality of stations where work is performed on the work pieces, and an endless conveyor having a forward run disposed between the upper and lower tooling for successively advancing work pieces to each of the stations of the tooling, the conveyor having openings therein in which work pieces rest normally spaced from the tooling, and a vacuum box which applies a vacuum to the side of the conveyor opposite the work pieces so as to hold them on the conveyor, an improved conveyor comprising a web having a plurality of transverse beads formed therein and spaced intermediate the work piece openings to inhibit deflection of the conveyor as it travels past the vacuum box, the beads defining flat portions of the web therebetween and the beads having a configuration which does not alter the condition of the flat portions such that they remain in a planar condition while carrying work pieces.

2. The structure of claim 1 wherein the conveyor further comprises a plurality of drive openings.

3. The structure of claim 1 wherein the beads extend from edge to edge across the conveyor.

4. The structure of claim 1 wherein the beads extend continuously across the conveyor.

5. The structure of claim 1 wherein the beads have an upraised ridge portion.

6. In a press for converting work pieces into parts, the press having lower tooling including a tool shoe mounted on a bed and upper tooling mounted on a reciprocating ram which moves the upper tooling into and out of operative engagement with the lower tooling, the upper and lower tooling having a plurality of stations where work is performed on the work pieces, and an endless conveyor having a forward run disposed between the upper and lower tooling for successively advancing work pieces to each of the stations of the tooling, the conveyor having openings therein in which work pieces rest normally spaced from the tooling, an improved conveyor comprising a web having a plurality of transverse beads formed therein and spaced intermediate the work piece openings to inhibit deflection of the conveyor, the beads defining flat portions of the web therebetween and the beads having a configuration which does not alter the condition of the flat portions such that they remain in a planar condition while carrying work pieces.

* * * * *